(12) United States Patent
Dingari et al.

(10) Patent No.: US 11,736,569 B2
(45) Date of Patent: Aug. 22, 2023

(54) MESSAGING IN AN ELECTRIC POWER SYSTEM

(71) Applicant: Schweitzer Engineering Laboratories, Inc, Pullman, WA (US)

(72) Inventors: Sreenivas Dingari, Chester Springs, PA (US); Veselin Skendzic, Schwenksville, PA (US); Hamza Abubakari, Pullman, WA (US); Greg Rzepka, Pullman, WA (US); Angelo D'Aversa, Ambler, PA (US); Balaji Janarthanan, Downingtown, PA (US); Chandrasekaran Swaminathan, Orefield, PA (US); Jyotsna Samhita Gokavarapu, King of Prussia, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/456,190

(22) Filed: Nov. 23, 2021

(65) Prior Publication Data

US 2023/0164220 A1    May 25, 2023

(51) Int. Cl.
  *G06F 15/16* (2006.01)
  *H04L 67/12* (2022.01)
  *H02J 13/00* (2006.01)

(52) U.S. Cl.
  CPC .......... *H04L 67/12* (2013.01); *H02J 13/0004* (2020.01); *H02J 13/00028* (2020.01)

(58) Field of Classification Search
  CPC .. H04L 67/12; H02J 13/00028; H02J 13/0004
  See application file for complete search history.

(56) References Cited

U.S. PATENT DOCUMENTS

| | | | |
|---|---|---|---|
| 9,620,955 B2 | 4/2017 | Dolezilek | |
| 10,560,390 B2 | 2/2020 | Gammel | |
| 10,756,956 B2 | 8/2020 | Gammel | |
| 10,812,392 B2 | 10/2020 | Gammel | |
| 11,374,866 B2 | 6/2022 | Gammel | |
| 2007/0198641 A1* | 8/2007 | Dorai | H04L 67/55 709/206 |
| 2008/0071482 A1* | 3/2008 | Zweigle | G01R 19/2513 702/62 |
| 2014/0280673 A1 | 9/2014 | Dolezilek | |
| 2019/0273653 A1 | 9/2019 | Gammel | |
| 2019/0273686 A1 | 9/2019 | Gammel | |
| 2019/0273691 A1 | 9/2019 | Gammel | |
| 2020/0412652 A1 | 12/2020 | Gammel | |

* cited by examiner

*Primary Examiner* — Normin Abedin
(74) *Attorney, Agent, or Firm* — Jared L. Cherry

(57) ABSTRACT

The present disclosure relates to systems and methods for processing a stream of messages in an electric power system (EPS). In one embodiment, a system may include a configuration subsystem to receive a plurality of criteria from an operator to identify a subset of the stream of messages for real-time processing. A receiver subsystem may identify the subset of the stream of messages based on at least one criterion from the plurality of criteria. A real-time processing subsystem may receive the subset of the stream of messages from the receiver subsystem, process the stream of messages within a fixed interval of a time of receipt, and update a value based on information in the processed stream of messages. A protective action subsystem may implement a protective action based on information in the processed stream of messages.

20 Claims, 4 Drawing Sheets

MESSAGING IN AN ELECTRIC POWER SYSTEM

TECHNICAL FIELD

The present disclosure pertains to messaging in an Electric Power System (EPS). More particularly, but not exclusively, the present disclosure relates to the use of the Generic Object Oriented Substation Events (GOOSE) protocol.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
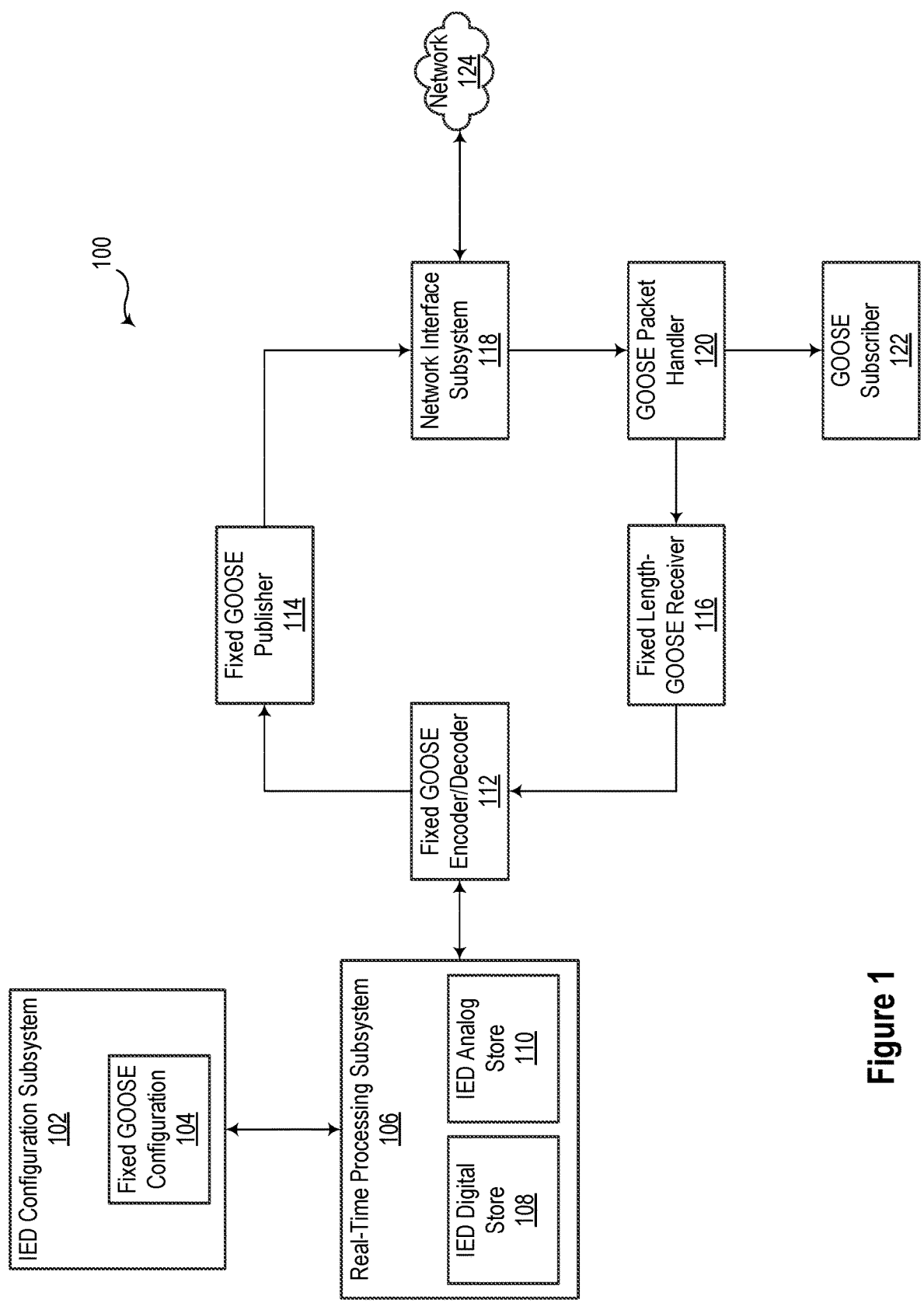
FIG. 1 illustrates a flow of GOOSE data in a system for messaging in an EPS consistent with embodiments of the present disclosure.

EPSs generate, transmit, or distribute electric power to an end user or load. Such systems may use various types of equipment such as generators, transformers, circuit breakers, switches, distribution lines, transmission lines, buses, capacitor banks, reactors, loads, and the like. Intelligent electronic devices (IEDs) are often used to collect electric power system information, make control and/or protection decisions, take control, automation, implement protection actions, and/or monitor the electric power delivery system.

IEDs may detect and remedy abnormal or dangerous conditions through protective actions, such as tripping. Conditions in an EPS may vary rapidly, and as such, latency or variability in communication may delay implementation of protective actions.

IEDs within an electric power delivery system may be interconnected by a variety of technologies and may utilize various communication protocols. IEC 61850 GOOSE is a flexible method for signaling and data sharing over an Ethernet network; however, the GOOSE protocol does not include established time parameters, and as such, may suffer from variability caused by network congestion or other issues.

The inventors of the present disclosure have recognized that certain advantages may be achieved by utilizing messaging in EPSs that is generated and processed in real-time or near real-time. In some embodiments, systems and methods disclosed herein may be used with GOOSE messages. Such systems may realize the flexibility offered by the GOOSE protocol along with the benefits of processing messages in real-time or near real-time in an EPS.

The embodiments of the present disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once unless otherwise specified.

In some cases, well-known features, structures, or operations are not shown or described in detail. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a flow of GOOSE data in a system 100 for messaging in an EPS consistent with embodiments of the present disclosure. A stream of data, including a plurality of GOOSE packets, may be exchanged with a network 124. Traffic unrelated to GOOSE may be routed as appropriate, but the details are not illustrated for the sake of simplicity.

GOOSE data packets received by network interface subsystem 118 may be routed to GOOSE packet handler 120. GOOSE data packets may be identified using the EtherType value 0x8868, which is associated with GOOSE data, and the destination multicast address. EtherType is a two-octet field in an Ethernet frame that can be used to identify a protocol used to encapsulate data in a payload of the frame. Still further, if the fourth octet of the multicast address is 0xFF then the packet is deemed a fixed-length GOOSE message and routed to a fixed-length GOOSE receiver 116. System 100 may process both fixed-length GOOSE messages and variable-length GOOSE messages. Variable-length GOOSE messages may be routed to an appropriate GOOSE subscriber 122 using a standard processing subsystem.

The fixed-length GOOSE receiver 116 may be responsible for validating fixed-length GOOSE data packets and pushing them to the fixed-length GOOSE encoder/decoder 112. The fixed-length GOOSE encoder/decoder 112 may be responsible for decoding the fixed-length GOOSE data and pushing the data to a real-time processing subsystem 106.

The real-time processing subsystem 106 may be responsible for monitoring digital and/or analog quantities selected using a fixed-length GOOSE configuration subsystem 104 and pushing any changes in the values to the fixed-length GOOSE encoder/decoder 112. Real-time processing subsystem 106 may include an IED digital store 108 and an IED analog store 110. The IED digital store 108 and the IED analog store 110 retain the digital and analog values in messages received by system 100 and/or published by system 100.

Real-time processing subsystem 106 may monitor the configured digital and analog quantities selected using the fixed-length GOOSE configuration subsystem 104 on a fixed schedule. In one specific embodiment, real-time processing subsystem 106 may process analog quantities every 24 milliseconds and the digital quantities every 4 milliseconds. In a system with a 60 Hz fundamental frequency, a cycle is approximately 16.67 milliseconds, and as such, 4 milliseconds represents approximately one-quarter of a cycle, and 24 milliseconds represents approximately one and a half cycles. Operating real-time processing subsystem 106 according to a fixed schedule ensures that data will be processed and/or published within a fixed interval of a time of receipt.

If a data change is detected in either the digital quantities or the analog quantities, a fixed-length GOOSE message may be published immediately. As established by the GOOSE protocol, a state number may be incremented in the published message, and duplicate messages may also be published. The duplicate messages may help to ensure that a subscribing device receives the update even if one or more packets is dropped. In duplicate messages, the state number does not change in these messages, but a sequence number may be updated.

Changes in values may be published by fixed-length GOOSE publisher 114 in the fixed-length GOOSE format. The published fixed-length GOOSE data packets may be routed to the network interface subsystem 118 for transmission via network 124.

System 100 also includes an IED configuration subsystem 102 that may be used to configure an IED. In various embodiments, the IED configuration subsystem 102 may be embodied as a graphical user interface, a command line interface, a web interface, PC-based software, such as the SEL Grid Configurator available from Schweitzer Engineering Laboratories of Pullman, Wash., or the like. A user may specify a variety of configuration settings using the IED configuration subsystem 102.

IED configuration subsystem 102 may enable a user to specify various settings for communications. In various embodiments, the communications may be formatted according to the GOOSE protocol. In one specific embodiment, fixed-length GOOSE encoded messages are described in IEC61850 standard Edition 2 amendment A1. The fixed-length GOOSE protocol establishes "fixed" offsets within a data packet. The only part varying in the packet is the content of the data, not its encoding. The fixed offsets may allow a system to optimize encoding and decoding of GOOSE messages.

A fixed-length GOOSE configuration subsystem 104 may be used to configure fixed-length GOOSE message. For example, an operator may specify specific quantities to map to fixed-length GOOSE messages using fixed-length GOOSE configuration subsystem. Fixed-length GOOSE messages may include analog quantities and digital quantities.

Figure 2:
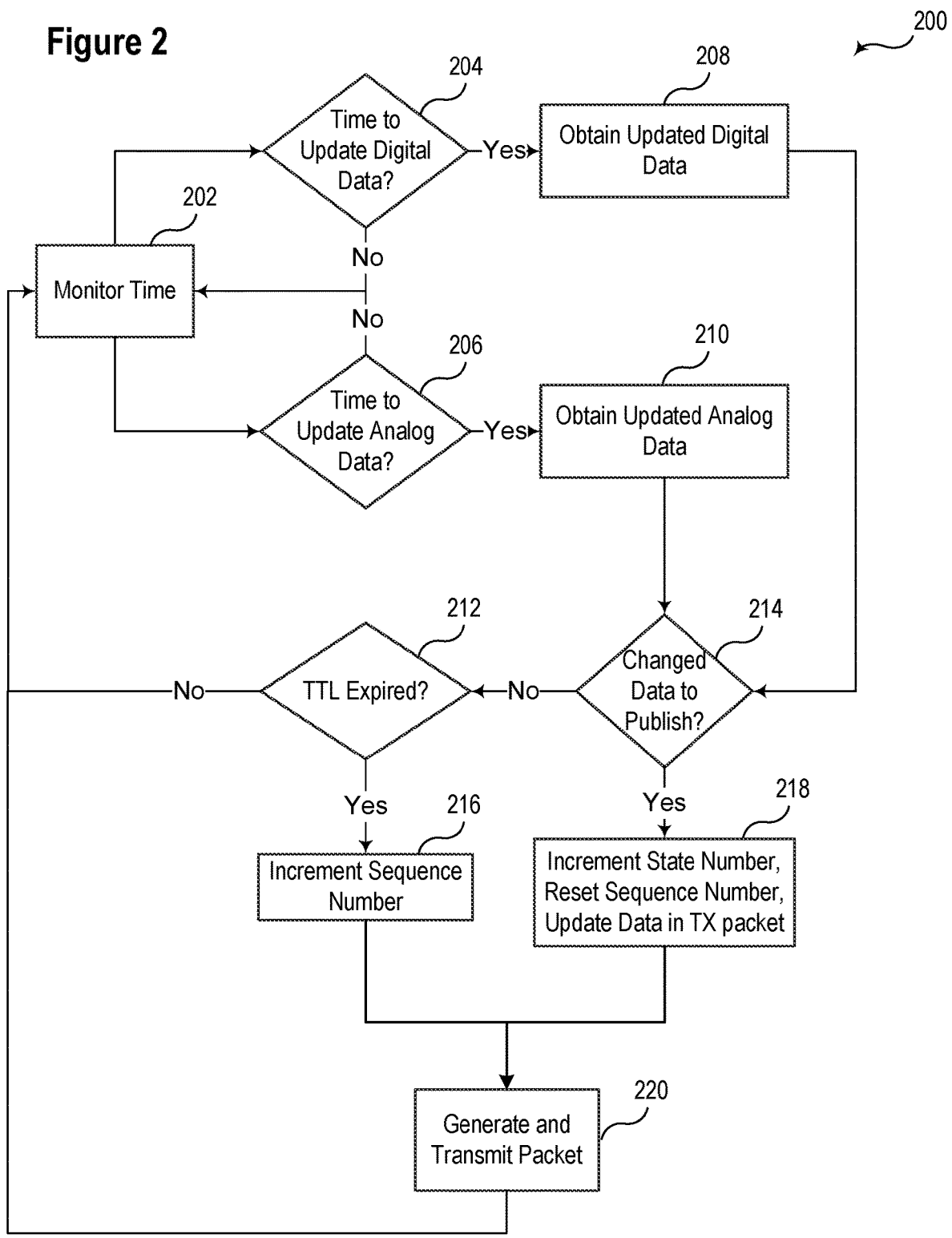
FIG. 2 illustrates a flowchart of a method for publishing fixed-length GOOSE messages in a messaging system in an EPS consistent with embodiments of the present disclosure.

FIG. 2 illustrates a flowchart of a method 200 for publishing fixed-length GOOSE messages in a messaging system in an EPS consistent with embodiments of the present disclosure. At 202, a system implementing method 200 may monitor time to determine when a fixed interval has elapsed. The fixed interval of publication allows devices to communicate in a peer-to-peer network with predictability and consistency. The predictability and consistency offered by method 200 is well suited to use in an EPS to provide up-to-date information related to electrical conditions to devices that monitor and protect the EPS.

At 204 and 206, method 200 may determine whether it is time to update digital data or analog data. In some embodiments, digital data may be updated at a different rate than analog data. For example and as discussed above, in one embodiment, analog quantities may be updated every 24 milliseconds and digital quantities may be updated every 4 milliseconds. In other embodiments, the time between updates may be greater or less. If it is not time to update either the digital data 204 or to update the analog data 206, method 200 may return to 202. Updated digital data may be obtained at 208 if method 200 determines that it is time to update the digital data at 204, and updated analog data may be obtained at 210 if method 200 determines that it is time to update the analog data at 206.

At 214, method 200 may determine whether the updated data comprises changed data. If the data has changed, a state number may be incremented, a sequence number may be reset, and the updated data may be included in a transmit packet at 218. The state number may allow receiving devices to determine changes in the state using a single identifier. The transmit packet may be generated and transmitted at 220.

If the data is unchanged at 214, method 200 may determine at 212 whether a time-to-live (TTL) value has been exceeded. Method 200 may be associated with a time-to-live (TTL) value. The TTL value may represent a maximum amount of time before the message should be repeated. In some embodiments, the TTL value may be included in transmitted packets, and subscribing devices may use the TTL value to determine if received data is valid. This scheme may accommodate some variation in delivery time while permitting receiving devices to identify a problem after a threshold amount of delay. If the TTL has expired at 212, a sequence number may be incremented at 216, and a packet may be generated and transmitted at 220. By transmitting a packet with an unchanged state number and an incremented sequence number, receiving devices are able to quickly process the packet because the state is unchanged.

Figure 3:
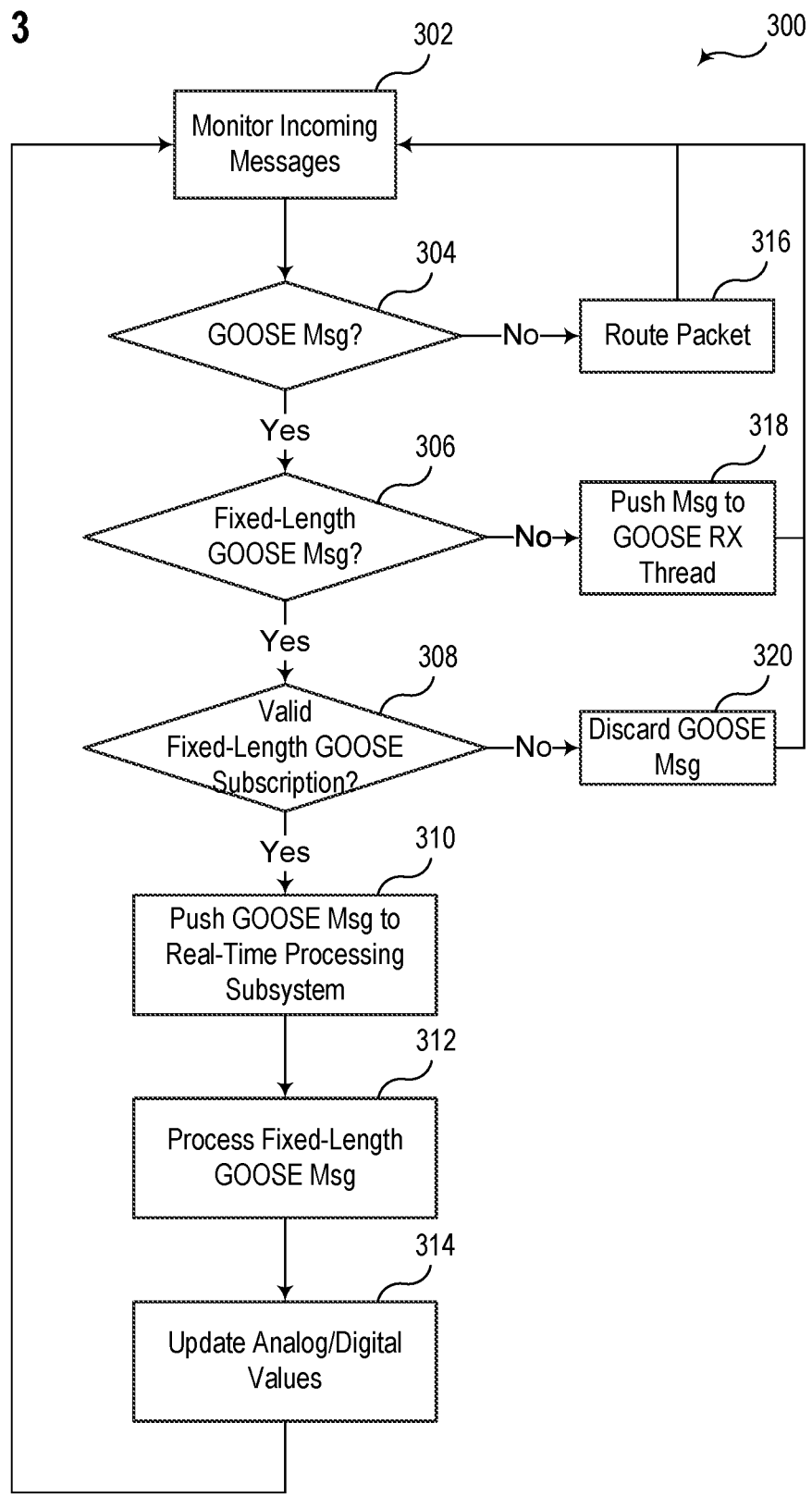
FIG. 3 illustrates a flowchart of a method for receiving fixed-length GOOSE messages in a messaging system in an EPS consistent with embodiments of the present disclosure.

FIG. 3 illustrates a flowchart of a method 300 for receiving fixed-length GOOSE messages in a messaging system in an EPS consistent with embodiments of the present disclosure. At 302, a system implementing method 300 may monitor incoming messages. In various embodiments, the incoming messages may be received from a network interface, such as the network interface subsystem 118 illustrated in FIG. 1. The incoming data may be monitored to identify relevant information used in connection with method 300. In certain embodiments, method 300 may be implemented in a driver of a communication interface, such as an Ethernet interface.

At 304, method 300 may determine if an incoming message is a GOOSE message. If the message is something other than a GOOSE message (e.g., a data packet in another format), it may be routed at 316 to another process. GOOSE packets may be identified using the EtherType value 0x88B8. Once the packet is routed at 316, method 300 may continue to monitor incoming data at 302.

At 306, method 300 may determine if the message is a fixed-length GOOSE message. If the received message is not a fixed-length GOOSE message, it may be pushed to a standard GOOSE receiving thread at 318. Method 300 may be used in connection with a real-time or near real-time system, and GOOSE messages that are not considered in connection with that system may be handled by a separate thread or process.

At 308, method 300 may determine if the GOOSE message relates to a valid fixed-length GOOSE subscription. GOOSE is a multicast protocol, and as such, a system implementing method 300 may receive messages published by devices to which the system does not subscribe. Such messages may be discarded at 320.

At 310, the GOOSE message may be pushed to a real-time processing subsystem and processed at 312. In one specific embodiment, the real-time processing subsystem may be embodied as real-time processing subsystem 106 illustrated in FIG. 1. A system implementing method 300 may be configured to give the highest priority to messages identified at 304, 306, and 308.

At 312, a real-time processing subsystem may process the fixed-length GOOSE message in real-time or near real-time. In one specific embodiment, the real-time processing subsystem may process messages on a fixed schedule (e.g., every 4 milliseconds). Some embodiments may utilize different schedules for processing digital values and analog values. Processing information according to a fixed schedule may allow operators to implement real-time or near real-time control strategies that can make an associated EPS more efficient and/or more reliable.

At 314, analog/digital values from the fixed-length GOOSE message may be updated. In some embodiments, the updated values may be made available to protection elements or used to perform other functions within the EPS. For example, if an analog value corresponds to a current measurement, the current measurement may be used by an over-current protective element to identify an over-current condition. Quickly identifying an over-current condition may minimize damage from arcing or other potentially hazardous conditions.

Figure 4:
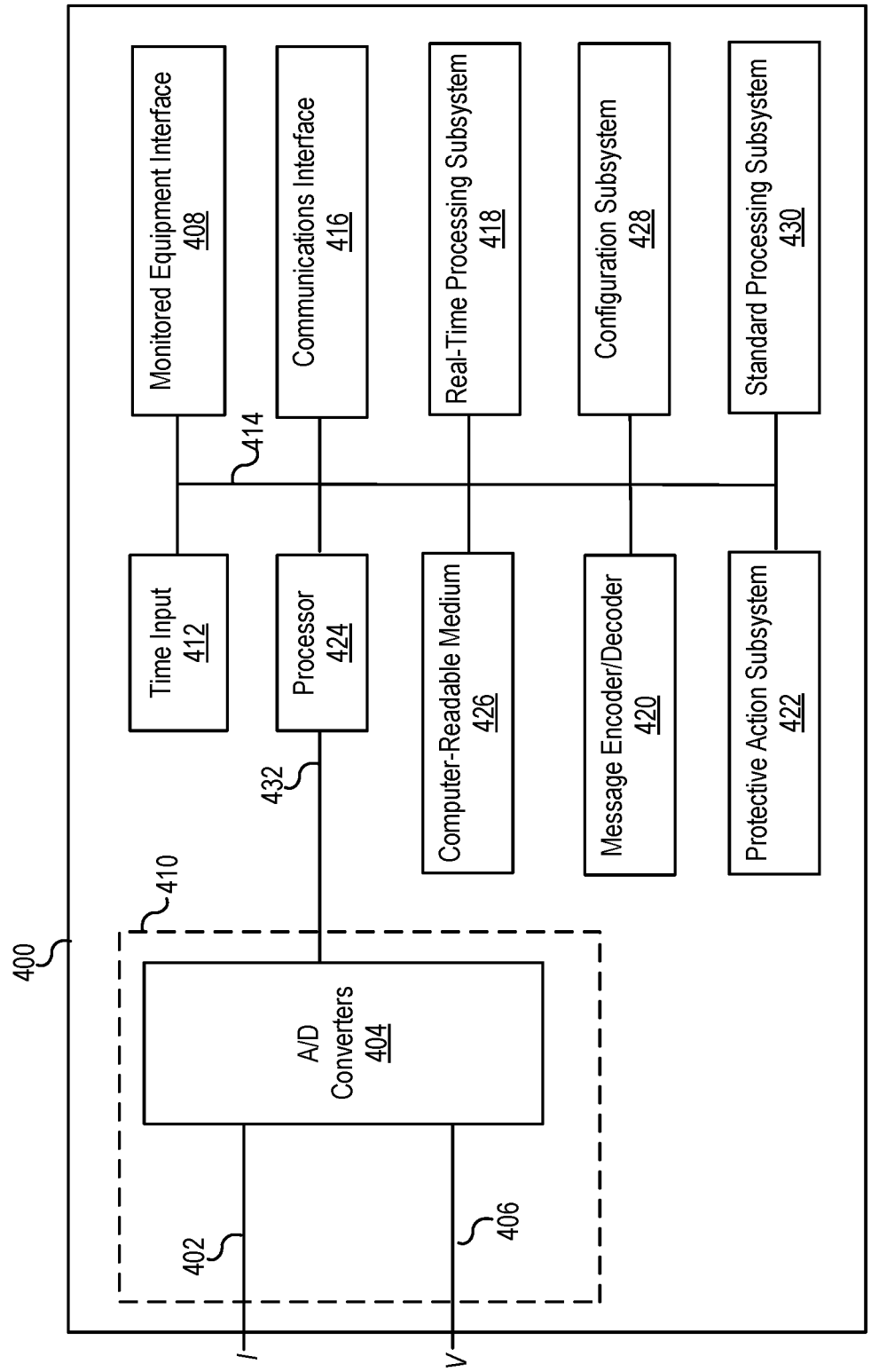
FIG. 4 illustrates a functional block diagram of a system for messaging in an EPS consistent with embodiments of the present disclosure.

FIG. 4 illustrates a simplified block diagram of a system 400 for coordinating protective elements in an EPS consistent with embodiments of the present disclosure. System 400 may be implemented using hardware, software, firmware, and/or any combination thereof. In some embodiments, system 400 may be embodied as a protective relay, intelligent electronic device (IED), or other type of device. Certain components or functions described herein may be associated with other devices or performed by other devices. The specifically illustrated configuration is merely representative of one embodiment consistent with the present disclosure.

System 400 includes a communications interface 416 to communicate with relays, IEDs, and/or other devices. In certain embodiments, the communications interface 416 may facilitate direct communication or communicate with systems over a communications network (not shown). System 400 may further include a time input 412, which may be used to receive a time signal (e.g., a common time reference) allowing system 400 to apply a time-stamp to acquired samples. In certain embodiments, a common time reference may be received via communications interface 416, and accordingly, a separate time input may not be required for time-stamping and/or synchronization operations. One such embodiment may employ the IEEE 1588 protocol. A monitored equipment interface 408 may receive status information from, and issue control instructions or protective actions to, a piece of monitored equipment (e.g., a circuit breaker, conductor, transformer, or the like).

Processor 424 processes communications received via communications interface 416, time input 412, and/or monitored equipment interface 408. Processor 424 may operate using any number of processing rates and architectures. Processor 424 may perform various algorithms and calculations described herein. Processor 424 may be embodied as a general-purpose integrated circuit, an application-specific integrated circuit, a field-programmable gate array, and/or any other suitable programmable logic device. A data bus 414 may provide connection between various components of system 400.

Instructions to be executed by processor 424 may be stored in computer-readable medium 426. Computer-readable medium 426 may comprise random access memory (RAM) and non-transitory storage. Computer-readable medium 426 may be the repository of software modules configured to implement the functionality described herein.

System 400 may include a sensor component 410. In the illustrated embodiment, sensor component 410 may receive current measurements 402 and/or voltage measurements 406. The sensor component 410 may comprise ND converters 404 that sample and/or digitize filtered waveforms to form corresponding digitized current and voltage signals. Current measurements 402 and/or voltage measurements 406 may include separate signals from each phase of a three-phase electric power system. ND converters 404 may be connected to processor 424 by way of data bus 432, through which digitized representations of current and voltage signals may be transmitted.

A real-time processing subsystem 418 may process a subset of a stream of communications received by system 400 in real-time or near real-time. The stream of communications may originate from communications interface 416, sensor component 410, and/or monitored equipment interface 408. The real-time processing subsystem 418 may be responsible for monitoring digital and/or analog quantities. The real-time processing subsystem 418 may receive values and/or publish values based on the configuration of system 400.

A message encoder/decoder 420 may encode or decode messages in various formats. In some embodiments, message encoder/decoder 420 may be configured to encode and decode messages in the GOOSE format. The message encoder/decoder 420 may also be responsible for identifying incoming messages to be processed by real-time processing subsystem 418.

A configuration subsystem 428 may allow an operator to configure various aspects of system 400, including criteria used to identify a subset of the stream of messages for real-time processing. For example, an operator may select specific types of communications to be processed using real-time processing subsystem 418. In one specific embodiment, communications encoded using the fixed-length GOOSE protocol may be selected for processing using real-time processing subsystem 418. Further, certain types of data collected by sensor 410 may be selected for publication using real-time processing subsystem 418.

A standard processing subsystem 430 may process communications received by system 400 that do not satisfy the criteria used to identify messages from the subset of the stream of messages for real-time processing.

A protective action subsystem 422 may implement a protective action based on various conditions monitored by system 400. In various embodiments, a protective action may include tripping a breaker, selectively isolating or disconnecting a portion of the electric power system, etc. Protective action subsystem 422 may coordinate protective actions with other devices in communication with system 400.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to process a stream of messages in an electric power system (EPS), comprising:
 a configuration subsystem to receive a plurality of criteria from an operator to identify a subset of the stream of messages for real-time processing;
 a receiver subsystem to identify the subset of the stream of messages based on at least one criterion from the plurality of criteria;
 a real-time processing subsystem to:
  receive the subset of the stream of messages from the receiver subsystem, the subset of the stream of messages comprising one of a digital quantity or an analog quantity representative of a condition in the EPS;
  process the stream of messages within a fixed interval of a time of receipt to generate a processed stream of messages; and
  update a value within the fixed interval of time and based on information in the processed stream of messages; and
 a protective action subsystem to implement a protective action based on the value in the processed stream of messages.

2. The system of claim 1, wherein the plurality of criteria comprises an EtherType corresponding to a protocol encapsulated in an Ethernet frame.

3. The system of claim 1, wherein the plurality of criteria identifies messages encoded with a fixed-length Generic Object Oriented Substation Events (GOOSE) protocol.

4. The system of claim 1, wherein the fixed interval of time is less than 24 milliseconds for analog data.

5. The system of claim 1, wherein the fixed interval of time is less than 4 milliseconds for digital data.

6. The system of claim 1, wherein the subset of the stream of messages comprises digital values and analog values.

7. The system of claim 1, further comprising a standard processing subsystem to process messages that fail to meet the plurality of criteria.

8. The system of claim 1, further comprising:
 an encoding subsystem to encode data and to push encoded data to the real-time processing subsystem;
 wherein the real-time processing subsystem is further configured to publish the encoded data within a fixed interval of the time of receipt.

9. The system of claim 8, further comprising at least one of a sensor component or a monitored interface to generate data to be encoded by the encoding subsystem and published by the real-time processing subsystem.

10. The system of claim 1 wherein the receiver subsystem is comprised by a driver in a communication interface.

11. A method of processing a stream of messages in an electric power system (EPS), comprising:
 receiving, using a configuration subsystem, a plurality of criteria from an operator to identify a subset of the stream of messages for real-time processing;
 identifying, using a receiver subsystem, the subset of the stream of messages based on at least one criterion from the plurality of criteria;
 receiving, using a real-time processing subsystem, the subset of the stream of messages from the receiver subsystem, the subset of the stream of messages comprising one of a digital quantity or an analog quantity representative of a condition in the EPS;
 processing, using the real-time processing subsystem, the stream of messages within a fixed interval of a time of receipt to generate a processed stream of messages;
 updating, using the real-time processing subsystem, a value within the fixed interval of time and based on information in the processed stream of messages; and
 implementing, using a protective action subsystem, a protective action based on the value in the processed stream of messages.

12. The method of claim 11, wherein the plurality of criteria comprises an EtherType corresponding to a protocol encapsulated in an Ethernet frame.

13. The method of claim 11, wherein the plurality of criteria identifies messages encoded with a fixed-length Generic Object Oriented Substation Events (GOOSE) protocol.

14. The method of claim 11, wherein the fixed interval of time is less than 24 milliseconds for analog data.

15. The method of claim 11, wherein the fixed interval of time is less than 4 milliseconds for digital data.

16. The method of claim 11, wherein the subset of the stream of messages comprises digital values and analog values.

17. The method of claim 11, further comprising processing, using a standard processing subsystem, messages that fail to meet the plurality of criteria.

18. The method of claim 11, further comprising:
 encoding data, using an encoding subsystem, to encode data and pushing encoded data to the real-time processing subsystem;
 publishing, using the real-time processing subsystem, the encoded data within a fixed interval of the time of receipt.

19. The method of claim 18, further comprising generating, using at least one of a sensor component or a monitored interface, data to be encoded by the encoding subsystem and published by the real-time processing subsystem.

20. The method of claim 11, wherein the receiver subsystem is comprised by a driver in a communication interface.

\* \* \* \* \*